(12) United States Patent
Cheng et al.

(10) Patent No.: US 9,502,962 B2
(45) Date of Patent: Nov. 22, 2016

(54) POWER FACTOR CORRECTION CIRCUIT AND POWER SUPPLY CIRCUIT

(71) Applicant: Huawei Technologies Co., Ltd., Shenzhen, Guangdong (CN)

(72) Inventors: Yang Cheng, Shenzhen (CN); Weifeng Wang, Shenzhen (CN); Xiaofeng Yao, Xi'an (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 234 days.

(21) Appl. No.: 14/136,794

(22) Filed: Dec. 20, 2013

(65) Prior Publication Data

US 2014/0132230 A1    May 15, 2014

Related U.S. Application Data

(63) Continuation of application No. PCT/CN2013/073869, filed on Apr. 8, 2013.

(30) Foreign Application Priority Data

Nov. 9, 2012    (CN) .......................... 2012 1 0447344

(51) Int. Cl.
*H02M 5/42*    (2006.01)
*H02M 1/42*    (2007.01)

(52) U.S. Cl.
CPC ......... *H02M 1/4216* (2013.01); *H02M 1/4208* (2013.01); *H02M 1/4225* (2013.01); *Y02B 70/126* (2013.01)

(58) Field of Classification Search
CPC .... Y02B 70/126; H02J 1/10; H02M 1/4216; H02M 1/4225; H02M 1/4208

USPC ......... 323/207; 363/87, 44, 45, 46, 84, 125, 363/127, 128, 129; 307/44, 45, 46, 48, 64, 307/66

See application file for complete search history.

(56) References Cited

U.S. PATENT DOCUMENTS

| 5,406,470 A | 4/1995 | Ridley et al. |
| 5,936,855 A * | 8/1999 | Salmon ............... H02M 1/4216 363/46 |

(Continued)

FOREIGN PATENT DOCUMENTS

| CN | 1909346 A | 2/2007 |
| CN | 101383555 A | 3/2009 |

(Continued)

*Primary Examiner* — Adolf Berhane
*Assistant Examiner* — Alex Torres-Rivera
(74) *Attorney, Agent, or Firm* — Leydig, Voit & Mayer, Ltd.

(57) ABSTRACT

Embodiments of the present application provide a power factor correction circuit and a power supply circuit. The power factor correction circuit includes a main correction circuit and a switch module. The main correction circuit includes: a first correction circuit and a second correction circuit that are configured to perform power factor correction on a forward alternating current voltage, and a third correction circuit and a fourth correction circuit that are configured to perform power factor correction on an inverse alternating current voltage. The switch module includes first switch units that are connected in parallel between an input terminal of the first correction circuit and an input terminal of the third correction circuit, and second switch units that are connected in parallel between an input terminal of the second correction circuit and an input terminal of the fourth correction circuit.

4 Claims, 8 Drawing Sheets

(56) References Cited

U.S. PATENT DOCUMENTS

| | | | | |
|---|---|---|---|---|
| 6,031,739 | A * | 2/2000 | He | H02M 1/4216 323/222 |
| 6,108,223 | A * | 8/2000 | Julian | H02M 7/1623 363/78 |
| 6,122,183 | A * | 9/2000 | He | H02M 1/4216 323/222 |
| 7,474,081 | B2 * | 1/2009 | Colombi | H02M 1/4216 323/266 |
| 2004/0160789 | A1 | 8/2004 | Ying et al. | |
| 2005/0052084 | A1 | 3/2005 | Yang | |
| 2007/0058401 | A1 | 3/2007 | Tan et al. | |
| 2009/0268496 | A1 | 10/2009 | Tan et al. | |
| 2010/0315849 | A1 * | 12/2010 | Ingemi | H02J 9/062 363/89 |
| 2011/0304214 | A1 | 12/2011 | Haddad | |
| 2013/0201731 | A1 | 8/2013 | Gu et al. | |

FOREIGN PATENT DOCUMENTS

| | | |
|---|---|---|
| CN | 101540507 A | 9/2009 |
| CN | 102510222 A | 6/2012 |
| CN | 102593910 A | 7/2012 |
| CN | 102931829 A | 2/2013 |
| WO | WO 2012048630 A1 | 4/2012 |

* cited by examiner

POWER FACTOR CORRECTION CIRCUIT AND POWER SUPPLY CIRCUIT

CROSS-REFERENCE TO RELATED APPLICATIONS

This application is a continuation of International Patent Application No. PCT/CN2013/073869, filed on Apr. 8, 2013, which claims priority to Chinese Patent Application No. 201210447344.8, filed on Nov. 9, 2012, both of which are hereby incorporated by reference in their entireties.

TECHNICAL FIELD

Embodiments of the present application relate to power factor technologies, and in particular, to a power factor correction circuit and a power supply circuit.

BACKGROUND

To improve an energy usage rate of a power supply, power factor correction needs to be performed for the power supply, especially on the output of an alternating current power supply. In a low-power uninterruptible power system (UPS), the current is relatively small and generally a single-phase input and single-phase output mode is used, a power factor correction circuit generally employs a single-boost circuit structure. In a large-power UPS, considering the factors such as ripple suppression, inductor design, selection of semiconductor components, and actual power distribution conditions, a three-phase input and three-phase output mode is generally used. In the large-power UPS, a power factor correction circuit of a dual-Boost circuit structure needs to be used to proactively perform power factor correction on each phase of circuit.

FIG. 1 is a schematic structural diagram of a conventional three-phase power factor correction circuit. As illustrated in FIG. 1, a conventional three-phase power factor correction circuit employs three independent dual-Boost circuit structures; for each phase of input voltages, the circuit in a dual-Boost circuit structure performs power factor correction; each Boost circuit structure is formed of a diode, an inductor, an insulated-gate bipolar transistor (IGBT), and a capacitor. Specifically, the circuit for performing power factor correction on the A-phase voltage in FIG. 1 includes a Boost circuit B1 and a Boost circuit B2. The Boost circuit B1 includes a series circuit formed of a diode D1, an inductor L1, a diode D21, and a capacitor C1, and an IGBT that is connected between an output terminal of the capacitor C1, the inductor L1, and the diode D21. The Boost circuit B2 is a circuit structure symmetrical to the Boost circuit B1. The diode current direction in one Boost circuit is just opposite to the diode current direction in the other Boost circuit. In this way, the circuit B1 can perform power factor correction on the forward input alternating current voltage, and the circuit B2 can perform power factor correction on the inverse input alternating current voltage. In the power factor correction on the A-phase voltage, when the A-phase voltage is positive, the diode D1 is turned on, and the A-phase voltage undergoes power factor correction performed by the Boost circuit B1; when the A-phase voltage is negative, D4 is turned on, and the A-phase voltage undergoes power factor correction performed by the Boost circuit B2. In this way, power factor correction can be proactively performed on the A-phase voltage using two Boost circuit branches. Likewise, the power factor correction on the B-phase voltage and the C-phase voltage is the same as that for the A-phase voltage. Evidently, each phase of input voltages undergoes power factor correction proactively performed by a corresponding pair of Boost circuits, which can improve the power factor of the power supply effectively and improve the energy usage rate of the power supply.

However, in the three-phase power factor correction circuit in the prior art, there are six Boost circuit branches in total. Because three phases of input voltages are all sine wave voltages, each Boost circuit branch works only in a half of its normal working time, and the usage rate of the Boost circuit branch is low, which results in that a lot of components are used in the power factor correction circuit, and increases the costs. Meanwhile, because each Boost circuit works intermittently, the current peak value of each Boost circuit branch is large, which is unfavorable to the design of the inductor in the Boost circuit branch.

SUMMARY

Embodiments of the present application provide a power factor correction circuit and a power supply circuit to not only implement power correction on input voltages, but also improve the correction circuit usage rate in power factor correction circuits and reduce costs of the power factor correction circuits.

In a first aspect, an embodiment of the present application provides a power factor correction circuit, including a main correction circuit and a switch module.

The main correction circuit includes: a first correction circuit and a second correction circuit that are configured to perform power factor correction on a forward alternating current voltage, and a third correction circuit and a fourth correction circuit that are configured to perform power factor correction on an inverse alternating current voltage, where output terminals of the first correction circuit, the second correction circuit, the third correction circuit, and the fourth correction circuit are electrically connected.

The switch module includes first switch units that are connected in parallel between an input terminal of the first correction circuit and an input terminal of the third correction circuit, and second switch units that are connected in parallel between an input terminal of the second correction circuit and an input terminal of the fourth correction circuit.

The first switch unit and the second switch unit each include two controlled switches that are connected in series, where a voltage input terminal connected to a voltage input terminal providing an alternating current input voltage is set between the two controlled switches.

With reference to the first aspect, in a first possible implementation mode, each correction circuit includes an inductor, a diode, and a capacitor that are connected in sequence, and a switch component connected between the diode and the capacitor.

With reference to the first possible implementation mode of the first aspect, in a second possible implementation mode, the first correction circuit and the second correction circuit share a capacitor, and/or the third correction circuit and the fourth correction circuit share a capacitor.

With reference to the first aspect, or the first or second possible implementation mode of the first aspect, in a third possible implementation mode, the switch module includes three first switch units that are connected in parallel and three second switch units that are connected in parallel, where one of the first switch units and one of the second switch units form an input voltage control switch block; and A voltage input terminal on each pair of input voltage control switch blocks is configured to connect alternating current input voltages of different phases in a three-phase alternating current input voltage.

With reference to the first aspect or the first or second or third possible implementation mode of the first aspect, in a fourth possible implementation mode, the controller switch is a thyristor.

In a second aspect, an embodiment of the present application provides a power supply circuit, including a power factor correction circuit provided in the embodiments of the present application;

A switch module in the power factor correction circuit is connected to an alternating current power supply, and the alternating current power supply is configured to provide an alternating current input voltage.

With reference to the second aspect, in a first possible implementation mode, the power supply circuit further includes a direct current power supply for supplying a direct current voltage, where the direct current power supply is mounted in the power supply circuit by using a switch component, and is configured to provide a direct current voltage when the alternating current power supply fails.

With reference to the first possible implementation mode of the second aspect, in a second possible implementation mode, the direct current power supply is mounted at an input terminal and/or an output terminal of the switch module.

With reference to the first possible implementation mode of the second aspect, in a third possible implementation mode, the direct current power supply is mounted between a neutral wire and at least two of three phases of output terminals of the alternating current power supply respectively by using a switch component.

With reference to the first possible implementation mode of the second aspect, in a fourth possible implementation mode, the direct current power supply is mounted between any two of the three phases of output terminals of the alternating current power supply by using a switch component.

With reference to the first possible implementation mode of the second aspect, in a fifth possible implementation mode, the direct current power supply is mounted between at least one of three phases of output terminals of the alternating current power supply and the input terminal of the third correction circuit and the input terminal of the fourth correction circuit respectively, and a switch component is connected between the direct current power supply and the at least one phase of output terminal, and between the direct current power supply and the input terminal of the third correction circuit and the input terminal of the fourth correction circuit, respectively.

With reference to the first possible implementation mode of the second aspect, in a sixth possible implementation mode, the direct current power supply is mounted between the input terminal of the first correction circuit or the second correction circuit and the input terminal of the third correction circuit or the fourth correction circuit by using a switch component.

With reference to the first possible implementation mode of the second aspect, in a seventh possible implementation mode, the direct current power supply is mounted between the input terminals of the first correct circuit and the second correction circuit and the input terminals of the third correction circuit and the fourth correction circuit, and a switch component is connected between the direct current power supply and the input terminals of the first correction circuit, the second correction circuit, the third correction circuit, and the fourth correction circuit.

With reference to the first possible implementation mode of the second aspect, in an eighth possible implementation mode, the direct current power supply is mounted between a neutral wire and the input terminals of the first correction circuit and/or the second correction circuit, and between the neutral wire and the input terminals of the third correction circuit and/or the fourth correction circuit respectively by using a switch component.

With reference to the first possible implementation mode of the second aspect, in a ninth possible implementation mode, the direct current power supply is connected between a neutral wire and at least one of three phases of output terminals of the alternating current power supply, and between the neutral wire and the first correction circuit, the second correction circuit, the third correction circuit, or the fourth correction circuit, respectively by using a switch component.

In the power factor correction circuit and the power supply circuit provided in the embodiments of the present application, the turn-on or turn-off of an electric connection between an input voltage and each correction circuit are controlled through a set switch module. Therefore, in the process of the power factor correction performed on the input voltage, all correction circuits are put into use efficiently, each correction circuit is fully used, the usage rate of each correction circuit is improved, and the costs of the power factor correction circuits are reduced.

DESCRIPTION OF EMBODIMENTS

To make the objectives, technical solutions, and advantages of the embodiments of the present application more comprehensible, the technical solutions in the embodiments of the present application are clearly and completely described in the following with reference to the accompanying drawings in the embodiments of the present application. Apparently, the described embodiments are merely a part rather than all of the embodiments of the present application. All other embodiments obtained by persons of ordinary skill in the art based on the embodiments of the present application without creative efforts shall fall within the protection scope of the present application.

A power factor correction circuit provided in an embodiment of the present application includes a main correction circuit and a switch module. The main correction circuit includes: a first correction circuit and a second correction circuit that are configured to perform power factor correction on a forward alternating current voltage, and a third correction circuit and a fourth correction circuit that are configured to perform power factor correction on an inverse alternating current voltage, where output terminals of the first correction circuit, the second correction circuit, the third correction circuit, and the fourth correction circuit are electrically connected. The switch module includes first switch units that are connected in parallel between an input terminal of the first correction circuit and an input terminal of the third correction circuit, and second switch units that are connected in parallel between an input terminal of the second correction circuit and an input terminal of the fourth correction circuit; where the first switch unit and the second switch unit each include two controlled switches that are connected in series, where a voltage input terminal connected to a voltage input terminal providing an alternating current input voltage is set between the two controlled switches. The power factor correction circuit in this embodiment can proactively perform power factor correction on a three-phase input voltage or a single-phase input voltage, the implementation of which is detailed in subsequent embodiments.

Figure 1:
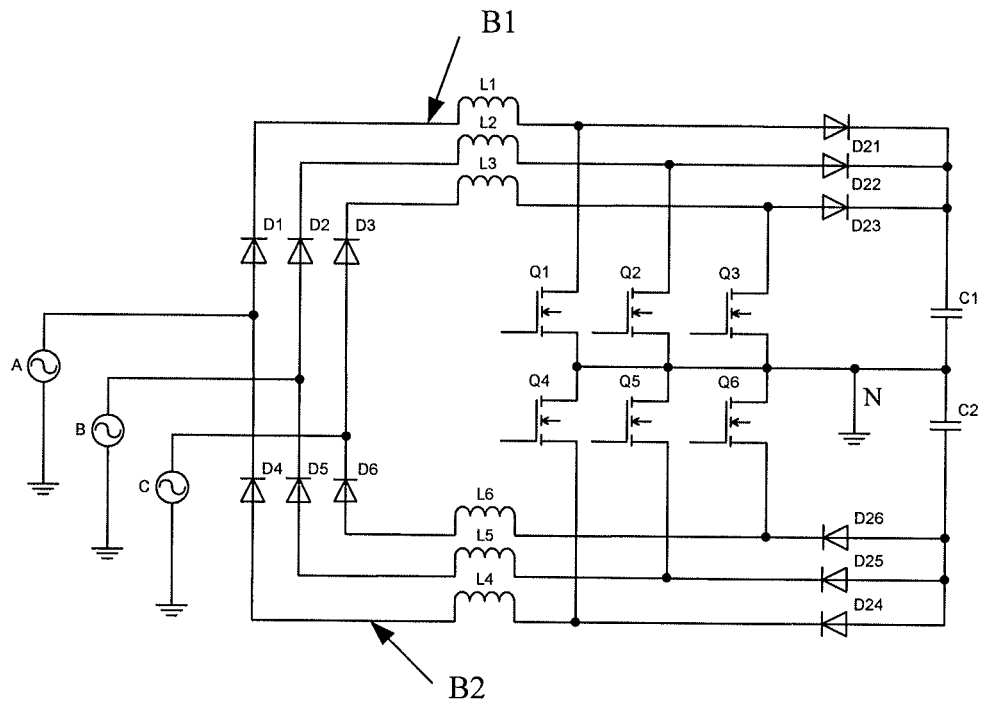
FIG. 1 is a schematic structural diagram of a conventional three-phase power factor correction circuit.
Figure 2A:
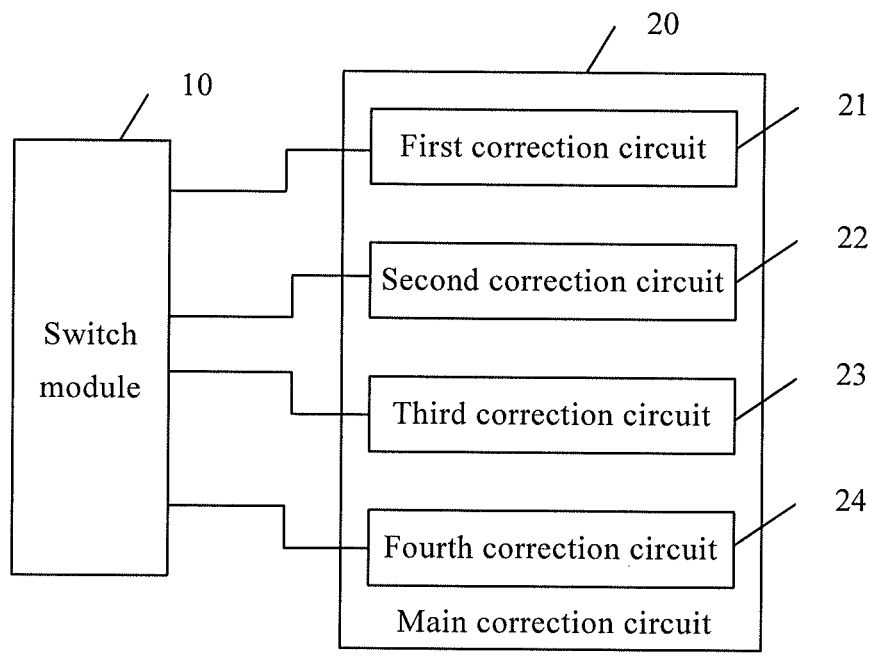
FIG. 2A is a schematic structural diagram of a power factor correction circuit according to Embodiment 1 of the present application.
Figure 2B:
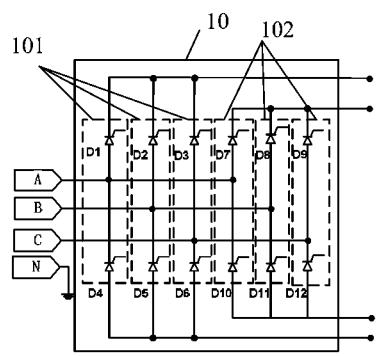
FIG. 2B is a schematic structural diagram of a switch module in FIG. 2A.

FIG. 2A is a schematic structural diagram of a power factor correction circuit according to Embodiment 1 of the present application; and FIG. 2B is a schematic structural diagram of a switch module in FIG. 2A. As illustrated in FIG. 2A, the power factor correction circuit in this embodiment includes a switch module 10 and a main correction circuit 20. The main correction circuit 20 includes a first correction circuit 21, a second correction circuit 22, a third correction circuit 23, and a fourth correction circuit 24. The first correction circuit 21 and the second correction circuit 22 are configured to perform power factor correction on a forward alternating current voltage, and the third correction circuit 23 and the fourth correction circuit 24 are configured to perform power factor correction on an inverse alternating current voltage, where output terminals of the four correction circuits are electrically connected. The switch module 10 is connected to an input terminal of each correction circuit, and is configured to turn on and turn off an electric connection between an alternating current input voltage and each correction circuit. In this embodiment, the switch module 10 can control turn-on or turn-off of an electric connection between an alternating current input voltage and each correction circuit. Therefore, power factor correction can be performed on the forward alternating current voltage of the alternating current input voltage by using the first correction circuit 21 and/or the second correction circuit 22, and power factor correction can be performed on the inverse alternating current voltage by using the third correction circuit 23 and/or the fourth correction circuit 24, thereby implementing power factor correction on the alternating current input voltage and improving the usage rate of electric energy of the power supply.

In this embodiment, as illustrated in FIG. 2B, the switch module 10 may specifically include a first switch unit 101 and a second switch unit 102. The first switch unit 101 is connected in parallel between the input terminal of the first correction circuit 21 and the input terminal of the fourth correction circuit 24; the second switch unit 102 is connected in parallel between the input terminal of the second correction circuit 22 and the input terminal of the third correction circuit 23; the first switch unit 101 and the second switch unit 102 each are formed of two controlled switches that are connected in series, and a voltage input terminal connected to an input voltage is set between the two controlled switches.

In this embodiment, the power factor correction is performed on a three-phase alternating current input voltage. As illustrated in FIG. 2B, there is three first switch units 101 and three second switch units 102; where one first switch unit 101 and one second switch unit 102 form an input voltage control switch block, and the voltage input terminal on each pair of input voltage control switch blocks is configured to connect a different phase of input voltages. As illustrated in FIG. 2B, the A-phase voltage, the B-phase voltage, and the C-phase voltage are respectively connected to different input voltage control switch blocks, respectively. In this way, by using each controlled switch in each switch unit, each phase of alternating current input voltages can be controlled to connect to different correction circuits at different time. Those skilled in the art understand that in FIG. 2B, N represents a neutral wire, and A phase, B phase, and C phase represent live wires.

In this embodiment, the turn-on and turn-off of an electric connection between the alternating current input voltage and the correction circuit are controlled through a set switch module. When the alternating current input voltage is positive, a correction circuit for performing power factor correction on a forward alternating current voltage may be used for correction; when the alternating current input voltage is negative, a correction circuit for performing power factor correction on an inverse alternating current voltage may be used for correction. Therefore, in the process of the power factor correction performed on a three-phase alternating current input voltage, the electric connection between each phase of alternating current input voltages and each correction circuit is controlled, four correction circuits are fully used to correct the three-phase alternating current input voltage, the usage rate of each correction circuit is improved effectively, required correction circuits are reduced, and the costs of the correction circuits are reduced.

In conclusion, in the power factor correction circuit provided in this embodiment, the turn-on or turn-off of an electric connection between the input voltage and each correction circuit is controlled through a set switch module. Therefore, in the process of the power factor correction performed on the input voltage, all correction circuits are put into use efficiently, and each correction circuit is fully used, the usage rate of each correction circuit is improved, and the costs of the power factor correction circuits are reduced.

Figure 3:
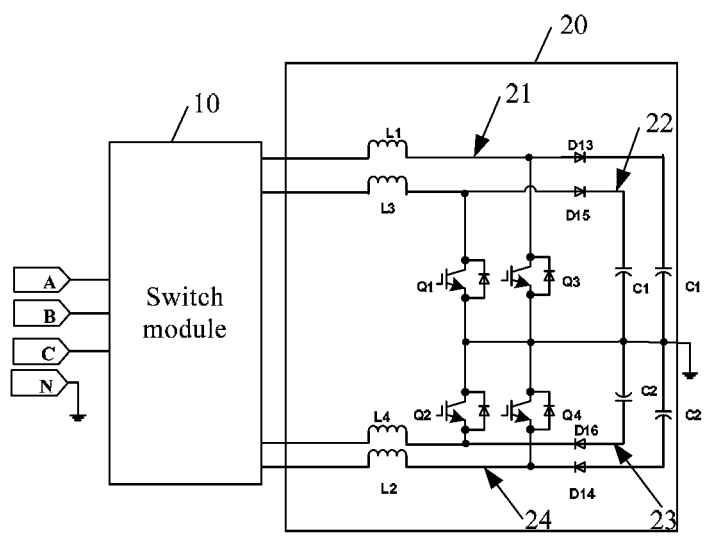
FIG. 3 is a schematic structural diagram of a power factor correction circuit according to Embodiment 2 of the present application.

FIG. 3 is a schematic structural diagram of a power factor correction circuit according to Embodiment 2 of the present application. In this embodiment, as illustrated in FIG. 3, a first correction circuit 21, a second correction circuit 22, a third correction circuit 23, and a fourth correction circuit 24 each include an inductor, a diode, and a capacitor that are connected in sequence, and include a switch tube connected between the diode and the capacitor, where the switch tube in this embodiment is an insulated-gate bipolar transistor (Insulated Gate Bipolar Transistor, IGBT); and forward current is allowed to be conducted in a current conduction direction of the diode and the IGBT in the first correction circuit 21 and the second correction circuit 22, so as to enable the first correction circuit 21 and the second correction circuit 22 to perform power factor correction on the forward alternating current voltage, where the first correction circuit 21 and the second correction circuit 22 may be referred to as "rectifying forward circuits". Similarly, an inverse current is allowed to be conducted in a current conduction direction of the diode and the IGBT in the third correction circuit 23 and the fourth correction circuit 24, so as to enable the third correction circuit 23 and the fourth correction circuit 24 to perform power factor correction on the inverse alternating current voltage, where the third correction circuit 23 and the fourth correction circuit 24 may be referred to as "rectifying inverse circuits". Those skilled in the art understand that types of the switch tube include not only the IGBT but also other switch tubes capable of controlling the turn-on of the circuit; in the correction circuit that allows the forward current to be conducted through, the connected capacitor may be a forward capacitor, the connected diode may be referred as a forward diode; and the correction circuit is specifically a Boost circuit, whose working process is the same as or similar to a conventional Boost circuit.

In this embodiment, the switch module 10 can connect the forward alternating current voltage in the alternating current input voltage to the first correction circuit 21 and/or the second correction circuit 22. In this way, the turn-on and turn-off of the IGBT in the first correction circuit 21 and the second correction circuit 22 can be controlled to perform power factor compensation on the forward alternating current voltage in the alternating current input voltage. Similarly, the switch module 10 can connect the inverse alternating current voltage in the alternating current input voltage to the third correction circuit 23 and/or the fourth correction circuit 24 to perform power factor compensation on the inverse alternating current voltage part. The principles are the same as those of the conventional power factor correction circuit, and are not described here any further.

In this embodiment, the first correction circuit 21, the second correction circuit 22, the third correction circuit 23, and the fourth correction circuit 24 are all Boost circuits. The first correction circuit 21 and the fourth correction circuit 24 may make up a dual-Boost circuit structure, and the second correction circuit 22 and the third correction circuit 23 may make up a dual-Boost circuit structure, so that the two dual-Boost structures are used to perform power factor correction on the alternating current input voltage, where the alternating current input voltage may be a three-phase input voltage or a single-phase input voltage.

In this embodiment, all electronic components in each correction circuit may have the same model except for the fact that, in the first correction circuit and the second correction circuit which perform power factor correction on a forward alternating current input voltage, both the diode and the IGBT are in a forward conduction connection mode, and the capacitor is also connected in a forward connection mode, so that the capacitor is capable of storing forward voltage. Conversely, in the third correction circuit and the fourth correction circuit which perform power factor correction on an inverse alternating current input voltage, the connection directions of the diode, the IGBT, and the capacitor are opposite to those of the first correction circuit, so that power factor correction can be performed on an inverse alternating current input voltage.

Figure 4:
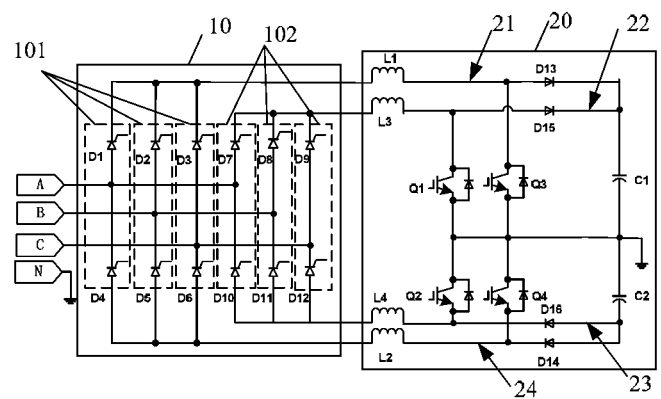
FIG. 4 is a schematic structural diagram of a power factor correction circuit according to Embodiment 3 of the present application.

FIG. 4 is a schematic structural diagram of a power factor correction circuit according to Embodiment 3 of the present application. This embodiment differs from the forward circuit in the embodiment illustrated in FIG. 3 in that: In this embodiment, a first correction circuit 21 and a second correction circuit 22 can share a capacitor, and a third correction circuit 23 and a fourth correction circuit 24 can share a capacitor, thereby reducing the number of required capacitors. Those skilled in the art understand that, in practice, it is also appropriate to allow only the first correction circuit 21 and the second correction circuit 22 to share a capacitor, but the third correction circuit and the fourth correction circuit shares no capacitor, and no special limitation is imposed herein.

To facilitate understanding of the technical solutions disclosed in the embodiments of the present application, the following describes a process of power factor correction performed on a three-phase input voltage with reference to an embodiment.

Figure 5:
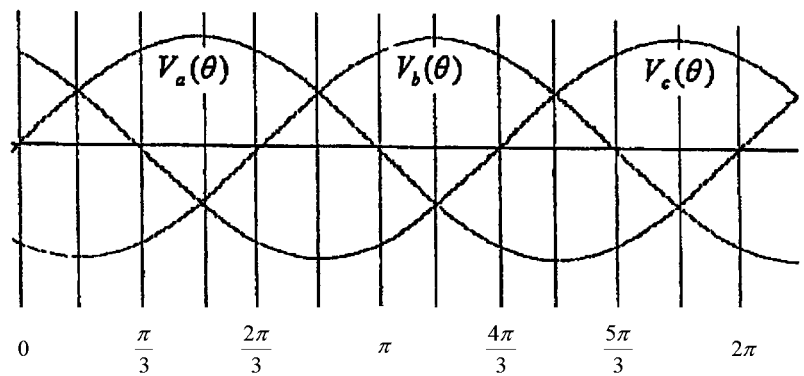
FIG. 5 is a schematic diagram of a three-phase input voltage according to Embodiment 3 of the present application.

FIG. 5 is a schematic diagram of a three-phase input voltage according to Embodiment 3 of the present application. In FIG. 5, the horizontal coordinate represents a phase of voltages, and the vertical coordinate represents a voltage value corresponding to each different phase. At each time point, that is, on each corresponding phase in FIG. 5, it is always true that voltages of two phases are positive and the voltage of one phase is negative. Therefore, at each time point, once the electric connection between the input voltage of each phase and each correction circuit is controlled, power factor correction can be performed on the three-phase input voltage using the four correction circuits. Specifically, working modes of the power factor correction circuit may be categorized into six modes according to the positive-negative switch point of each phase of voltages and phase intervals. They are $$\text{mode 1:} \left[ 0 \quad \frac{\pi}{3} \right]; \text{mode 2:} \left[ \frac{\pi}{3} \quad \frac{2\pi}{3} \right];$$

$$\text{mode 3:} \left[ \frac{2\pi}{3} \quad \pi \right]; \text{mode 4} \left[ \pi \quad \frac{4\pi}{3} \right];$$

$$\text{mode 5:} \left[ \frac{4\pi}{3} \quad \frac{5\pi}{3} \right]; \text{and mode 6:} \left[ \frac{5\pi}{3} \quad 2\pi \right].$$

In mode 1, the A-phase voltage and the C-phase voltage are positive, and the B-phase voltage is negative. In mode 2, the A-phase voltage is positive, and the B-phase voltage and the C-phase voltage are negative. In mode 3, the A-phase voltage and the B-phase voltage are positive, and the C-phase voltage is negative. In mode 4, the B-phase voltage is positive, and the A-phase voltage and the C-phase voltage are negative. In mode 5, the A-phase voltage is negative, and the B-phase voltage and the C-phase voltage are positive. In mode 6, the C-phase voltage is positive, and the A-phase voltage and the B-phase voltage are negative. In this way, in each mode, all switches in the switch module 10 can be controlled, and the input voltage in each mode can be connected to each correction circuit to perform power factor correction on the input voltage.

The following describes the control on each switch in the switch module 10 and the conducting direction of currents in each mode.

First, to facilitate the description of this embodiment, different symbols are used to denote inductors, diodes, capacitors, and IGBTs in each correction circuit, and controlled switches in the switch module 10. Specifically, controlled switches D1 and D4, D2 and D5, D3 and D6, respectively form a first switch unit 101; D7 and D10, D8 and D11, D9 and D12, respectively form a second switch unit 102, and a voltage input terminal between D1 and D4, and a voltage input terminal between D7 and D10, are each electrically connected to the A-phase voltage; a voltage input terminal between D2 and D5, and a voltage input terminal between D8 and D11, are each electrically connected to the B-phase voltage; a voltage input terminal between D3 and D6, and a voltage input terminal between D9 and D12, are each electrically connected to the C-phase voltage.

$$\text{Mode 1:} \left[ 0 \quad \frac{\pi}{3} \right] \tag{1}$$

In this mode, the A-phase voltage and the C-phase voltage are positive, and the B-phase voltage is negative. In this case, controlled switches in the switch module 10 may be controlled to turn on D1, D5, D9, and D11 and turn off all other controlled switches. In this way, the A-phase voltage is electrically connected to the first correction circuit 21, charges L1 through D1-L1-Q3 and charges the positive capacitor C1 through D1-L1-D13; the C-phase voltage is electrically connected to the second correction circuit 22, charges L3 through D9-L3-Q1 and charges the positive capacitor C1 through D9-L3-D15; the B-phase voltage is electrically connected to the third correction circuit 23 and the fourth correction circuit 24, and the current flows through the two correction circuits that are connected in parallel, charges L2 through Q2-L4-D11 and Q4-L2-D5, and charges the negative capacitor C2 through C2-D16-L4-D11 and C2-D14-L2-D5.

$$\text{Mode 2:} \left[ \frac{\pi}{3} \quad \frac{2\pi}{3} \right] \tag{2}$$

In this mode, the A-phase voltage is positive, and the B-phase voltage and the C-phase voltage are negative. In this case, controlled switches in the switch module 10 may be controlled to turn on D1, D6, D7, and D11 and turn off all other controlled switches. In this way, the A-phase voltage is electrically connected to the first correction circuit 21 and the second correction circuit 22, charges L1 through D1-L1-Q3, charges L3 through D7-L3-Q1, and charges the positive capacitor C1 through D1-L1-D13 and D7-L3-D15; the B-phase voltage is electrically connected to the third correction circuit 23, charges L4 through Q2-L4-D11, and charges the negative capacitor C2 through C2-D16-L4-D11; the C-phase voltage is electrically connected to the fourth correction circuit 24, charges L2 through Q4-L2-D6, and charges the negative capacitor C2 through C2-D14-L2-D6.

$$\text{Mode 3:} \left[ \frac{2\pi}{3} \quad \pi \right] \tag{3}$$

In this mode, the A-phase voltage and the B-phase voltage are positive, and the C-phase voltage is negative. In this case, controlled switches in the switch module 10 may be controlled to turn on D2, D6, D7, and D12 and turn off all other controlled switches. In this way, the A-phase voltage is electrically connected to the second correction circuit 22, charges L3 through D7-L3-Q1, and charges the positive capacitor C1 through D7-L3-D15; the B-phase voltage is electrically connected to the first correction circuit 21, charges L1 through D2-L1-Q3, and charges the positive capacitor C1 through D2-L1-D13; the C-phase voltage is electrically connected to the third correction circuit 23 and the fourth correction circuit 24, charges L4 through Q2-L4-D12, charges L2 through Q4-L2-D6, and charges the negative capacitor C2 through C2-D16-L4-D12 and C2-D14-L2-D6.

$$\text{Mode 4:} \left[ \pi \quad \frac{4\pi}{3} \right] \tag{4}$$

In this mode, the B-phase voltage is positive, and the A-phase voltage and the C-phase voltage are negative. In this case, controlled switches in the switch module 10 may be controlled to turn on D2, D4, D8, and D12 and turn off all other controlled switches. In this way, the B-phase voltage is electrically connected to the first correction circuit 21 and the second correction circuit 22, charges L1 through D2-L1-Q3, charges L3 through D8-L3-Q1, and charges the positive capacitor C1 through D2-L1-D13 and D8-L3-D15; the A-phase voltage is electrically connected to the fourth correction circuit 24, charges L2 through Q4-L2-D4, and charges the negative capacitor C2 through D14-L2-D4; the C-phase voltage is electrically connected to the third correction circuit 23, charges L4 through Q2-L4-D12, and charges the negative capacitor C2 through D16-L4-D12.

$$\text{Mode 5:} \left[ \frac{4\pi}{3} \quad \frac{5\pi}{3} \right] \tag{5}$$

In this mode, the A-phase voltage is negative, and the B-phase voltage and the C-phase voltage are positive. In this case, controlled switches in the switch module 10 may be controlled to turn on D3, D4, D8, and D10 and turn off all other controlled switches. In this way, the A-phase voltage is electrically connected to the third correction circuit 23 and the fourth correction circuit 24, charges L4 through Q2-L4-D10, charges L2 through Q4-L2-D4, and charges the negative capacitor C2 through C2-D14-L2-D4; the B-phase voltage is electrically connected to the second correction circuit 22, charges L3 through D8-L3-Q1, and charges the positive capacitor C1 through D8-L3-D15; the C-phase voltage is electrically connected to the first correction circuit 21, charges L1 through D3-L1-Q3, and charges the positive capacitor C1 through D3-L1-D13.

$$\text{Mode 6:} \left[ \frac{5\pi}{3} \quad 2\pi \right] \tag{6}$$

In this mode, the C-phase voltage is positive, and the A-phase voltage and the B-phase voltage are negative. In this case, controlled switches in the switch module 10 may be controlled to turn on D3, D5, D9, and D10 and turn off all other controlled switches. In this way, the C-phase voltage is electrically connected to the first correction circuit 21 and the second correction circuit 22, charges L1 through D3-L1-Q3, charges L3 through D9-L3-Q1, and charges the positive capacitor C1 through D9-L3-D15; the A-phase voltage is electrically connected to the third correction circuit 23, charges L4 through Q2-L4-D10, and charges the negative capacitor C2 through D16-L4-D10; the B-phase voltage is electrically connected to the fourth correction circuit 24, charges L2 through Q4-L2-D5, and charges the negative capacitor C2 through D14-L2-D5.

Those skilled in the art understand that, when the controlled switches in the switch module 10 are controlled, by detecting the phase of one of the three phases of alternating current input voltages may be detected, and controlling the phase according to the six modes, so that four correction circuits can perform power factor correction on the three phases of alternating current voltages. In practice, each controlled switch in the switch unit may be controlled in a certain order according to a preset control policy to make the three phases of alternating current input voltages share the four correction circuits. For example, the A-phase voltage may serve as a reference, and a time cycle corresponding to each of the six modes is set, where the time cycle starts when the phase of the A-phase voltage changes to 0; the corresponding controlled switch is controlled in each time cycle according to the same control policy, so as to share the four correction circuits, the implementation of which is not described here any further.

In this embodiment, each controlled switch in the switch module 10 may be a thyristor. Those skilled in the art understand that the control switch may also be a switch of other forms, such as an IGBT, which is not specially limited herein; or, the switch module 10 may also be switches of other forms connected in series or in parallel, or may be a switch unit that is set independently. Any type of the switches is appropriate if the switches can control the circuit connection between the alternating current input voltage and each correction circuit.

When the power factor correction circuit in this embodiment performs power factor correction on the three-phase input voltage, four correction circuits may be configured to implement the correction. Compared with the prior art, this embodiment saves one dual-Boost circuit structure and two inductors, reduces the size and number of heat sinks of the power factor correction circuit, and reduces the costs of the power factor correction circuits.

Figure 6:
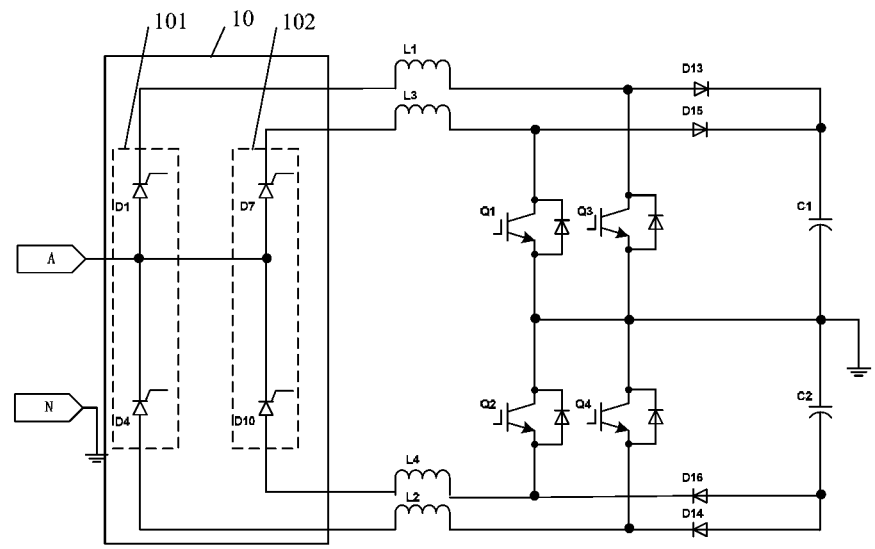
FIG. 6 is a schematic structural diagram of a power factor correction circuit according to Embodiment 4 of the present application.

FIG. 6 is a schematic structural diagram of a power factor correction circuit according to Embodiment 4 of the present application. In this embodiment, the power factor correction circuit can perform power factor correction on only one phase of alternating current input voltages, and both the number of first switch units and the number of second switch units may be 1. Specifically, as illustrated in FIG. 6, the switch module 10 includes only one first switch unit 101 and one second switch unit include 102; each switch unit is formed of two controlled switches that are connected in series, where a voltage input terminal connected to a voltage input terminal providing an alternating current input voltage is set between the two controlled switches. The specific structure is the same as the switch unit structure illustrated in FIG. 4, and the controlled switches are also thyristors.

In this embodiment, it is assumed that one phase of input voltages is A-phase. When the A-phase voltage is positive, each controlled switch in the switch module 10 can be controlled to turn on D1 and D7, and turn off D4 and D10. In this way, the A-phase alternating current input voltage undergoes power factor correction by using the first correction circuit 21 and the second correction circuit 22. In this case, the A-phase voltage charges L1 and L3 through D1-L1-Q3 and D7-L3-Q1 respectively, and charges the positive capacitor C1 through D1-L1-D13 and D7-L3-D15. Similarly, when the A-phase voltage is negative, power factor correction is performed by the third correction circuit 23 and the fourth correction circuit 24. In this case, the A-phase voltage charges L4 and L2 through Q2-L4-D10 and Q4-L2-D4 respectively, and charges the negative capacitor C2 through D16-L4-D10 and D14-L2-D4.

This embodiment gives a schematic diagram of a circuit structure for controlling only one phase of alternating current input voltages. Those skilled in the art understand that, based on the technical solution of the embodiment illustrated in FIG. 4, they can control the switch module to perform power factor correction on one phase of alternating current input voltages, that is, the circuit illustrated in FIG. 4 can perform both power factor correction on one phase of alternating current input voltages and power factor correction on three phases of alternating current input voltages, and can also perform power factor correction on two phases of alternating current input voltages, which is not specially limited herein.

Figure 7:
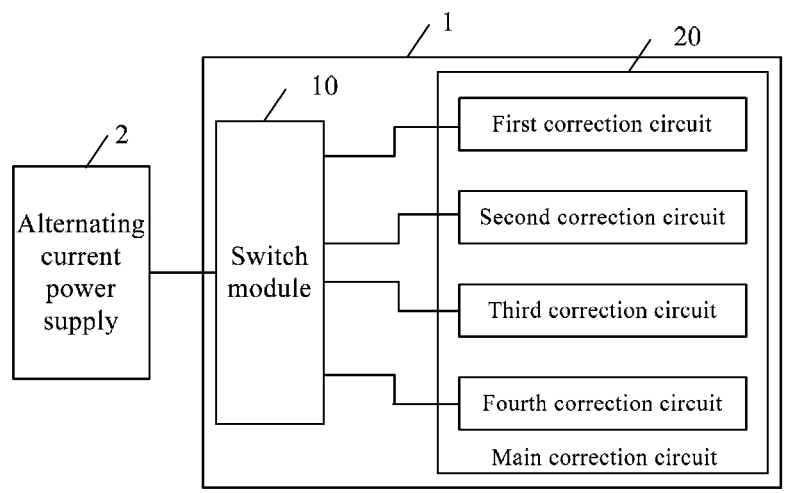
FIG. 7 is a schematic diagram of a power supply circuit according to Embodiment 5 of the present application.

FIG. 7 is a schematic diagram of a power supply circuit according to Embodiment 5 of the present application. As illustrated in FIG. 7, the power supply circuit in this embodiment includes a power factor correction circuit 1 and an alternating current power supply 2. The power factor correction circuit 1 may be a power factor correction circuit provided in the above embodiments, and its structure and functions are not repeated here any further; the alternating current power supply 2 is connected to a switch module 10 in the power factor correction circuit 1, and is configured to provide an alternating current input voltage.

In this embodiment, the switch module 10 can control the turn-on and turn-off of the electric connection between each input voltage and each correction circuit, so that each correction circuit is used to perform power factor correction on each input voltage and the stability of the output voltage is improved.

In the power supply circuit provided in this embodiment, a direction current power supply may be deployed in addition to the alternating current power supply. The direct current power supply may be mounted in the power supply circuit by using a switch component, so as to provide, when the alternating current power supply fails, a direct current voltage for the power supply circuit by using the switch component.

In this embodiment, the direct current power supply may be mounted at the input terminal of the switch module in the power factor correction circuit, or mounted at the output terminal of the switch module. The following description assumes that the direct current power supply is mounted in different positions in the power supply circuit in different mounting manners.

Figure 8:
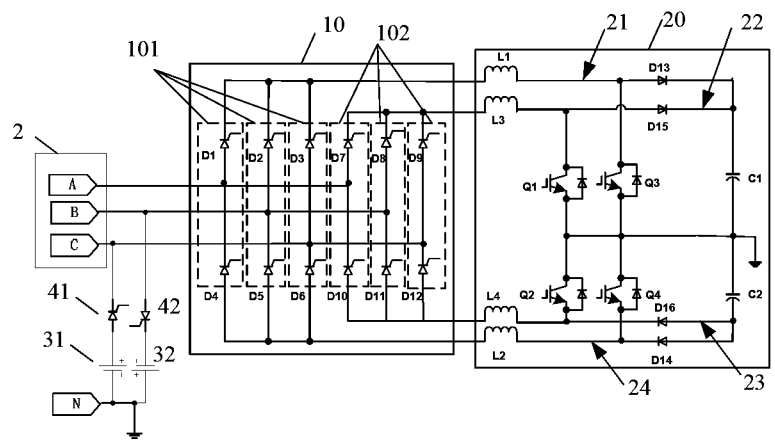
FIG. 8 is a schematic diagram of a power supply circuit according to Embodiment 6 of the present application.

FIG. 8 is a schematic diagram of a power supply circuit according to Embodiment 6 of the present application. In this embodiment, the direct current power supply is mounted at the input terminal of the switch module, that is, at the output terminal of the alternating current power supply; and, in three phases of output terminals of the alternating current power supply, a direct current power supply is mounted between the neutral wire and at least two phases of output terminals each by using a switch component. Specifically, as illustrated in FIG. 8, the power factor correction circuit 1 in this embodiment is a power factor correction circuit illustrated in FIG. 3; the alternating current power supply 2 is a three-phase alternating current output power supply, and can output three phases of alternating current voltages, that is, A-phase, B-phase, and C-phase; the phase difference between the three phases of alternating current voltages is 120 degrees; a direct current power supply is mounted between the neutral wire and each of a B-phase output terminal and a C-phase output terminal by using a switch component, that is, a direct current power supply 31 is mounted between the neutral wire and the B-phase output terminal by using a switch component 41, and a direct current power supply 32 is mounted between the neutral wire and the C-phase output terminal by using a switch component 42.

In this embodiment, the direct current power supply 31 and the direct current power supply 32 may be batteries; the batteries are not only mountable between the neutral wire and the B-phase output terminal or the C-phase output terminal, but also mountable between the neutral wire and an A-phase output terminal or the B-phase output terminal, or between the neutral wire and A-phase output terminal or the C-phase output terminal, or between the neutral wire and the A-phase output terminal, or the B-phase output terminal, or the C-phase output terminal. Those skilled in the art understand that the direct current power supply is preferably mounted between the neutral wire and two phases of output terminals, which ensures that, once the alternating current power supply fails, the direct current power supply 31 can supply power to the first correction circuit 21 and/or the second correction circuit 22 (that is, rectifying positive), and the direct current power supply 32 can supply power to the third correction circuit 23 and/or the fourth correction circuit 24 (that is, rectifying negative), thereby ensuring that the power supply circuit can provide a reliable power supply to a load normally.

In this embodiment, when the alternating current power supply 2 fails and is unable to provide an alternating current voltage, control may be exercised onto the switch component 41, the switch component 42, and the switch module 10 to connect the direct current power supply 31 and the direct current power supply 32 each into the power supply circuit; the direct current power supply 31 may provide a forward voltage for the branch that includes the first correction circuit 21 and the second correction circuit 22, and the direct current power supply 32 may provide an inverse voltage for the branch that includes the third correction circuit 23 and the fourth correction circuit 24, so as to ensure that the power supply circuit can provide voltages for external loads continuously and stably. Those skilled in the art understand that, to enable the direct current power supply to provide forward or inverse voltages for the branch, when the direct current power supply is connected to the circuit, the cathode and anode connection directions of two direct current power supplies, that is, the direct current power supply 31 and direct current power supply 32 are reversed, so as to ensure that the direct current power supply 31 can provide a forward voltage for the first correction circuit 21 and the second correction circuit 22, and that the direct current power supply 32 can provide an inverse voltage for the third correction circuit 23 and the fourth correction circuit 24.

Figure 9:
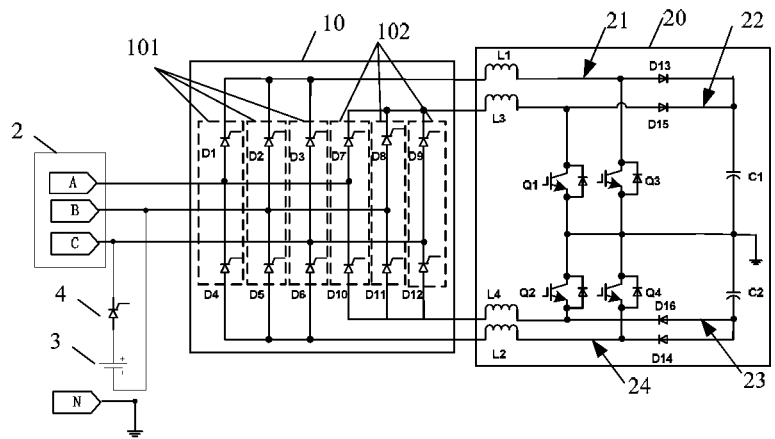
FIG. 9 is a schematic diagram of a power supply circuit according to Embodiment 7 of the present application.

FIG. 9 is a schematic diagram of a power supply circuit according to Embodiment 7 of the present application. This embodiment differs from the technical solution in the embodiment illustrated in FIG. 8 in that: In the three phases of output terminals of the alternating current power supply in this embodiment, a direct current power supply may be mounted between any two phases of output terminals by using a switch component. Specifically, as illustrated in FIG. 9, a direct current power supply 3 is mounted between a B-phase output terminal and a C-phase output terminal of the alternating current power supply 2 by using a switch component 4.

Those skilled in the art understand that, by controlling the switch component 4 and a switch module 10, the direct current power supply 3 can provide a forward voltage for a first correction circuit 21 and a second correction circuit 22 and provide an inverse voltage for a third correction circuit 23 and a fourth correction circuit 24. Therefore, when the alternating current power supply fails, the direct current power supply 3 can be used to provide a direct current power supply for the power supply circuit.

Figure 10:
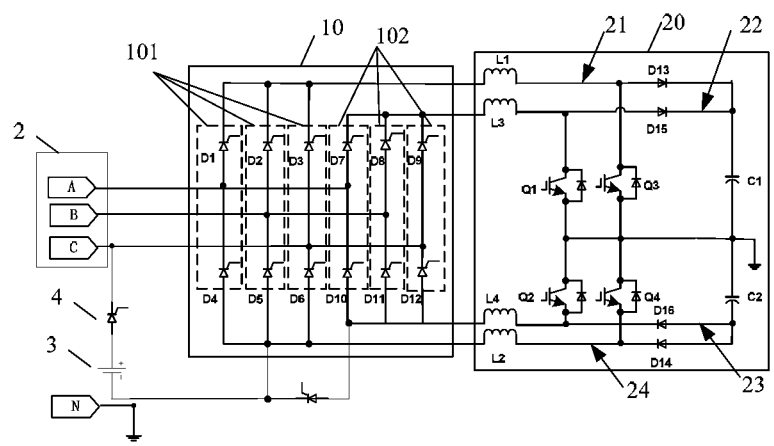
FIG. 10 is a schematic diagram of a power supply circuit according to Embodiment 8 of the present application.

FIG. 10 is a schematic diagram of a power supply circuit according to Embodiment 8 of the present application. In this embodiment, a direct current power supply may be mounted at the input terminal and the output terminal of the switch module simultaneously. That is, the direct current power supply is mounted between at least one of three phases of output terminals of an alternating current power supply and each of the input terminal of a third correction circuit and the input terminal of a fourth correction circuit, and a switch component is connected between the direct current power supply and the at least one phase of output terminal, and between the direct current power supply and each of the input terminal of the third correction circuit and the input terminal of the fourth correction circuit. Specifically, as illustrated in FIG. 10, a direct current power supply 3 is connected between a C-phase output terminal of an alternating current power supply 2 and each of the input terminal of a third correction circuit 23 and the input terminal of a fourth correction circuit 24, and a switch component 4 is connected between the direct current power supply 3 and the C-phase output terminal, and between the direct current power supply 3 and the input terminal of the third correction circuit 23.

Those skilled in the art understand that, by controlling the switch component 4 and the switch module 10, the direct current power supply 3 can provide a forward voltage for the first correction circuit 21 and the second correction circuit 22 and provide an inverse voltage for the third correction circuit 23 and the fourth correction circuit 24. Therefore, when the alternating current power supply fails, the direct current power supply 3 can be configured to provide a direct current power supply for the power supply circuit. Meanwhile, to enable the direct current power supply 3 to provide an inverse voltage for the third correction circuit 23 and the fourth correction circuit 24, the cathode of the direct current power supply 3 should be connected to the third correction circuit 23 and the fourth correction circuit 24.

Figure 11:
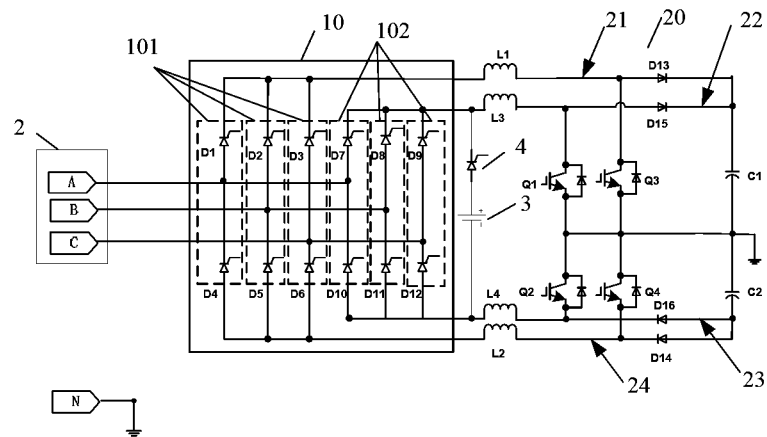
FIG. 11 is a schematic diagram of a power supply circuit according to Embodiment 9 of the present application.

FIG. 11 is a schematic diagram of a power supply circuit according to Embodiment 9 of the present application. In this embodiment, a direct current power supply may be mounted at the output terminal of a switch module. For example, the direct current power supply is mounted between the input terminal of a first correction circuit or a second correction circuit and the input terminal of a third correction circuit or a fourth correction circuit. Specifically, as illustrated in FIG. 11, a direct current power supply 3 is mounted between a second correction circuit 22 and a third correction circuit 23 by using a switch component 4.

Figure 12:
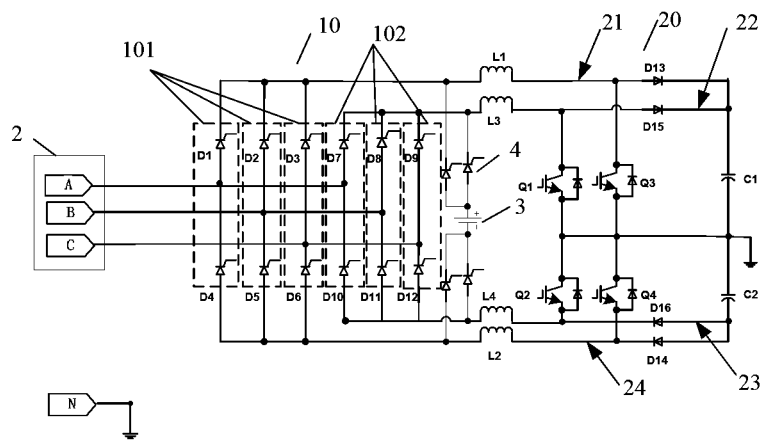
FIG. 12 is a schematic diagram of a power supply circuit according to Embodiment 10 of the present application.

FIG. 12 is a schematic diagram of a power supply circuit according to Embodiment 10 of the present application. This embodiment differs from FIG. 11 in that: In this embodiment, a direct current power supply may be mounted between the input terminals of a first correction circuit and a second correction circuit and the input terminals of a third correction circuit and a fourth correction circuit, and a switch component is connected between the direct current power supply and the input terminals of the first correction circuit, the second correction circuit, the third correction circuit, and the fourth correction circuit each. Specifically, as illustrated in FIG. 12, a direct current power supply 3 is mounted between the input terminals of a first correction circuit 21 and a second correction circuit 22 and the input terminals of a third correction circuit 23 and a fourth correction circuit 24, and a switch component 3 is connected between the direct current power supply 3 and the input terminals of the first correction circuit 21, the second correction circuit 22, the third correction circuit 23, and the fourth correction circuit 24 each.

Figure 13:
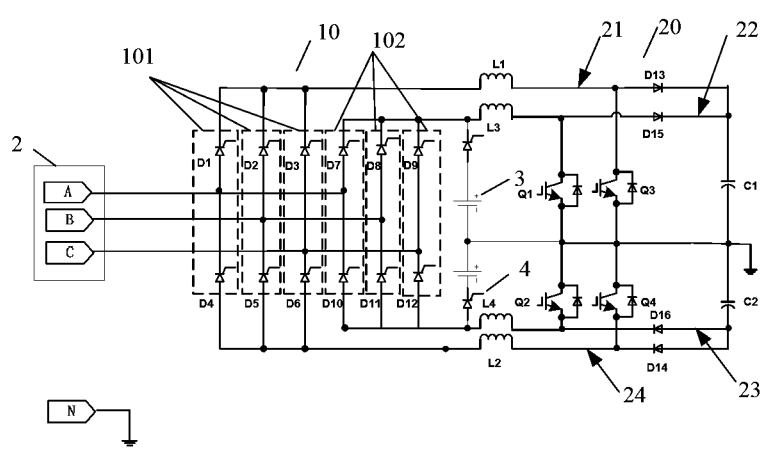
FIG. 13 is a schematic diagram of a power supply circuit according to Embodiment 11 of the present application.

FIG. 13 is a schematic diagram of a power supply circuit according to Embodiment 11 of the present application. This embodiment differs from the embodiment illustrated in FIG. 11 or FIG. 12 in that: In this embodiment, a direct current power supply may be mounted between a neutral wire and the input terminal of a first correction circuit or a second correction circuit, and between the neutral wire and the input terminal of a third correction circuit or a fourth correction circuit by using a switch component. Specifically, as illustrated in FIG. 13, in this embodiment, a direct current power supply 3 is mounted between the neutral wire and the input terminals of a second correction circuit 22 and a third correction circuit 23 each by using a switch component 4.

Those skilled in the art understand that, to ensure the direct current power supply 3 between the second correction circuit 22 and the neutral wire to provide a forward voltage for the second correction circuit 22, the anode of the direct current power supply 3 should be connected to the input terminal of the second correction circuit 22, and similarly, the cathode of the direct current power supply 3 between the second correction circuit 22 and the neutral wire should be connected to the third correction circuit 23. By controlling the switch component 3, the direct current power supply 3 can be connected to the power supply circuit, so that the direct current power supply is available when the alternating current power supply fails.

Figure 14:
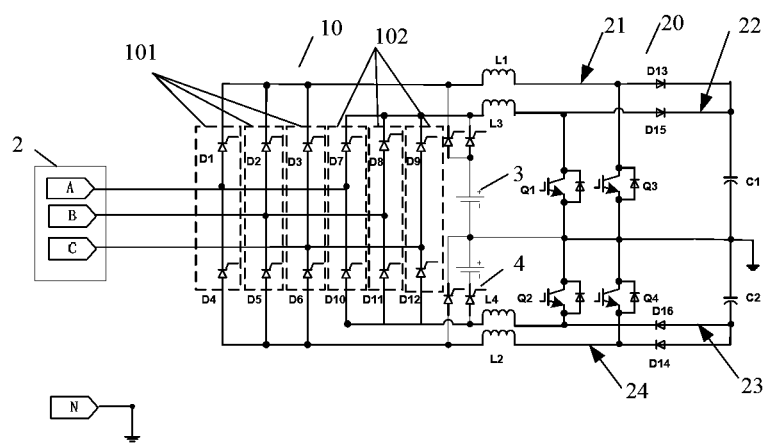
FIG. 14 is a schematic diagram of a power supply circuit according to Embodiment 12 of the present application.

FIG. 14 is a schematic diagram of a power supply circuit according to Embodiment 12 of the present application. This embodiment differs from the technical solution of the embodiment illustrated in FIG. 13 in that: In this embodiment, a direct current power supply may be mounted between an neutral wire and the input terminals of a first correction circuit and a second correction circuit, and between the neutral wire and the input terminal of a third correction circuit and a fourth correction circuit respectively by using a switch component. Specifically, as illustrated in FIG. 14, in this embodiment, a direct current power supply 3 is mounted between an neutral wire and each of a first correction circuit 21 and a second correction circuit 22, and between an neutral wire and each of a third correction circuit 23 and a fourth correction circuit 24 by using a switch component 4.

In this embodiment, four switch components 3 are enough for connecting the direct current power supply 3 to the circuit. Therefore, one direct current power supply 3 provides a forward voltage for the first correction circuit 21 and the second correction circuit 22, and another direct current power supply 3 provides an inverse voltage for the third correction circuit 23 and the fourth correction circuit 24.

Figure 15:
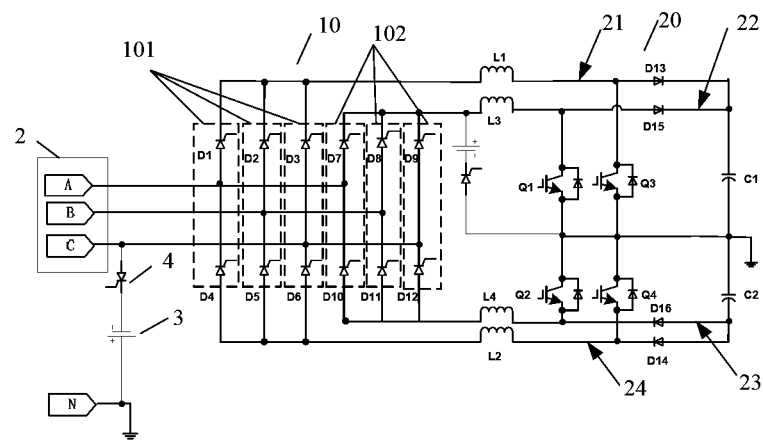
FIG. 15 is a schematic diagram of a power supply circuit according to Embodiment 13 of the present application.

FIG. 15 is a schematic diagram of a power supply circuit according to Embodiment 13 of the present application. In this embodiment, a direct current power supply may be mounted at the input terminal and the output terminal of the switch module each. Specifically, as illustrated in FIG. 15, a direct current power supply 3 is connected between a C-phase output terminal of an alternating current power supply 2 and a neutral wire, and connected between a second correction circuit 22 and an neutral wire by using a switch component 4.

Those skilled in the art understand that, by controlling the switch module 10 and the switch component 4, each direct current power supply 3 can be connected into the circuit, and the direct current supply 3 between the C-phase output terminal and the neutral wire provides an inverse voltage for a third correction circuit 23 or a fourth correction circuit 24, and another direct current supply 3 provides a forward voltage for the second correction circuit 22. Moreover, to ensure the direct current power supply 3 between the C-phase output terminal and the neutral wire to provide the inverse voltage for the third correction circuit 23 or the fourth correction circuit 24, the anode of one direct current power supply 3 should be connected to the neutral wire, and the anode of the other direct current power supply 3 should be connected to the input terminal of the second correction circuit 22.

In practice, a direct current power supply 3 may be mounted between the neutral wire and the output terminals of the A-phase and the B-phase output terminals of the three-phase alternating current power supply 2, and the direct current power supply 3 is connected between the neutral wire and each of the first correction circuit 21, the third correction circuit 23 and the fourth correction circuit 24. Those skilled in the art understand that for different connection modes, the electrode connection mode of the direct current power supply 3 may be adjusted properly to ensure that the corresponding correction circuit can provide the corresponding forward voltage or inverse voltage.

Those skilled in the art understand that in practice, one, two, or more than two direct current power supplies may be set in the power supply circuit; the direct current power supply may be a power supply such as lithium batteries; when there are more than two direct current power supplies, the direct current power supplies may be formed by batteries; in addition, the direct current power supply may be mounted in the circuit in a proper manner and connected into the power supply circuit in a proper position; and any manner and any position are appropriate if the direct current power supplies can be connected into the power supply circuit by using switch components to provide a forward voltage for the first correction circuit and/or the second correction circuit and provide an inverse voltage for the third correction circuit and/or the fourth correction circuit.

Persons of ordinary skill in the art may understand that, all or a part of the steps of the foregoing method embodiments may be implemented by a program instructing relevant hardware. The foregoing programs may be stored in a computer readable storage medium. When the program runs, the foregoing steps included in the method embodiments are performed. The foregoing storage medium includes various mediums capable of storing program codes, such as a ROM, a RAM, a magnetic disk or an optical disc.

Finally, it should be noted that the foregoing embodiments are merely intended for describing the technical solutions of the present application other than limiting the present application. Although the present application is described in detail with reference to the foregoing embodiments, persons of ordinary skill in the art should understand that they may still make modifications to the technical solutions described in the foregoing embodiments, or make equivalent replacements to some or all the technical features thereof, without departing from the scope of the technical solutions of the embodiments of the present application.

What is claimed is:

1. A power supply circuit comprising:
a power factor correction circuit receiving a direct current voltage from a direct current voltage power supply when an alternating current power supply fails, the power factor correction circuit comprising a main correction circuit and a switch module, wherein:
the main correction circuit comprises:
a first correction circuit and a second correction circuit configured to perform power factor correction on a forward alternating current voltage, and a third correction circuit and a fourth correction circuit configured to perform power factor correction on an inverse alternating current voltage, wherein output terminals of the first correction circuit, the second correction circuit, the third correction circuit, and the fourth correction circuit are electrically connected;
wherein each of the first second third and fourth correction circuits comprises an inductor, a diode, a capacitor and an active controlled switch connected between the diode and the capacitor; and
the switch module configured to receive an alternating current input voltage from the alternating current power supply, the switch module comprises:
first switch units connected in parallel between an input terminal of the first correction circuit and an input terminal of the fourth correction circuit, and second switch units connected in parallel between an input terminal of the second correction circuit and an input terminal of the third correction circuit;
the first switch unit and the second switch unit each comprises two controlled switches connected in series, wherein a voltage input terminal providing the alternating current input voltage is set between the two controlled switches;
the first switch unit and the second switch unit are three phase to single phase rectifier converters, wherein the first switch unit and the second switch unit each comprise two output terminals;
wherein a first output terminal of the first switch unit is directly coupled only to an input terminal of the inductor of the first correction circuit when operating in the forward alternating current voltage, and a second output terminal of the first switch unit is directly coupled only to an input terminal of the inductor of the fourth correction circuit when operating in the inverse alternating current voltage;
wherein a first output terminal of the second switch unit is directly coupled only to an input terminal of the inductor of the second correction circuit when operating in the forward alternating current voltage and a second output terminal of the second switch unit is directly coupled only to an input terminal of the inductor of the third correction circuit when operating in the inverse alternating voltage.

2. The power supply circuit according to claim 1, wherein the first correction circuit and the second correction circuit share the same capacitor.

3. The power supply circuit according to claim 1, wherein:
the switch module comprises three first switch units that are connected in parallel and three second switch units that are connected in parallel, wherein one of the first switch units and one of the second switch units form an input voltage control switch block; and
a voltage input terminal on each pair of input voltage control switch blocks is configured to connect alternating current input voltages of different phases in a three-phase alternating current input voltage.

4. The power supply circuit according to claim 1, wherein the third correction circuit and the fourth correction circuit share the same capacitor.

* * * * *